US009232516B1

(12) United States Patent
Oroskar et al.

(10) Patent No.: US 9,232,516 B1
(45) Date of Patent: Jan. 5, 2016

(54) MANAGING ALLOCATION OF FREQUENCY BANDWIDTH BETWEEN DONOR ACCESS LINK AND RELAY BACKHAUL LINK

(71) Applicant: Sprint Spectrum L.P., Overland Park, KS (US)

(72) Inventors: Siddharth S. Oroskar, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 181 days.

(21) Appl. No.: 14/147,140

(22) Filed: Jan. 3, 2014

(51) Int. Cl.
*H04W 72/04* (2009.01)
*H04W 16/26* (2009.01)
*H04W 36/06* (2009.01)

(52) U.S. Cl.
CPC ............ *H04W 72/042* (2013.01); *H04W 16/26* (2013.01); *H04W 36/06* (2013.01)

(58) Field of Classification Search
CPC ... H04W 72/042; H04W 16/26; H04W 36/06; H04W 7/2606; H04W 88/04; H04W 84/047; H04W 84/08; H04W 88/02; H04W 7/155; H04W 7/15542; H04B 7/18515; H04B 7/195; H04B 7/18521; H04B 7/18539; H04B 7/18534
See application file for complete search history.

(56) References Cited

U.S. PATENT DOCUMENTS

| | | | |
|---|---|---|---|
| 7,428,217 B2 * | 9/2008 | Kobayashi ............ | H04W 48/18 370/235 |
| 7,577,121 B2 | 8/2009 | Han et al. | |
| 8,391,254 B2 * | 3/2013 | Koo ................... | H04B 7/15542 370/315 |
| 8,423,033 B1 | 4/2013 | Everson et al. | |
| 8,634,842 B2 * | 1/2014 | Zhang ................... | H04W 72/04 370/315 |
| 2007/0217433 A1 * | 9/2007 | Doppler ................... | H04B 7/02 370/400 |
| 2008/0137591 A1 * | 6/2008 | Hirano ................... | H04L 63/18 370/328 |
| 2009/0003269 A1 * | 1/2009 | Kumazawa ........... | H04L 45/124 370/328 |
| 2009/0201848 A1 * | 8/2009 | Kumazawa ........... | H04W 80/04 370/328 |
| 2011/0081903 A1 * | 4/2011 | Cai ................... | H04W 36/0055 455/424 |
| 2011/0211503 A1 | 9/2011 | Che et al. | |
| 2011/0222428 A1 * | 9/2011 | Charbit .............. | H04B 7/15557 370/252 |
| 2011/0228700 A1 | 9/2011 | Mildh et al. | |
| 2012/0008544 A1 * | 1/2012 | Nakagawa ........... | H04B 7/2606 370/315 |
| 2012/0028627 A1 * | 2/2012 | Hunzinger ........ | H04W 36/0083 455/422.1 |
| 2012/0127872 A1 * | 5/2012 | Sheu ................... | H04L 12/1836 370/252 |
| 2012/0176958 A1 * | 7/2012 | Queseth ............. | H04B 7/15542 370/315 |
| 2012/0218886 A1 * | 8/2012 | Van Phan ........... | H04B 7/15592 370/229 |
| 2012/0243460 A1 * | 9/2012 | Muto ...................... | H04L 45/22 370/315 |
| 2012/0264368 A1 * | 10/2012 | Aminaka .......... | H04W 72/0446 455/9 |
| 2013/0034043 A1 | 2/2013 | Yu et al. | |

(Continued)

FOREIGN PATENT DOCUMENTS

FR 2782293 A1 * 9/2014 ............... H04B 3/36

*Primary Examiner* — Mehmood B Khan

(57) ABSTRACT

A method and system for allocating frequency bandwidth between a relay backhaul link and a donor access link, based at least in part on the PLMN(s) to which UE(s) served by the relay node subscribe. The donor base station or another controlling entity may determine the PLMN(s) to which one or more UEs currently served by the relay node subscribe and, based at least in part on the determined PLMN(s), may assign a PLMN-priority level to the relay. Based at least in part on the PLMN-priority level assigned to the relay, the controlling entity may then establish an allocation of the frequency bandwidth between the relay backhaul link and the donor access link, and the donor base station may apply that established allocation.

20 Claims, 5 Drawing Sheets

(56) References Cited

U.S. PATENT DOCUMENTS

| | | | | |
|---|---|---|---|---|
| 2013/0115955 A1* | 5/2013 | Deng | H04W 36/0061 | 455/437 |
| 2013/0163508 A1* | 6/2013 | Yu | H04W 16/14 | 370/315 |
| 2013/0172000 A1* | 7/2013 | Van Phan | H04W 16/26 | 455/450 |
| 2013/0250766 A1* | 9/2013 | Chaudhuri | H04W 72/1242 | 370/235 |
| 2013/0288694 A1* | 10/2013 | Mochizuki | H04W 72/042 | 455/450 |
| 2013/0343261 A1* | 12/2013 | Gonsa | H04B 7/2606 | 370/315 |
| 2014/0126460 A1* | 5/2014 | Bienas | H04W 74/002 | 370/315 |
| 2014/0206352 A1* | 7/2014 | Mochizuki | H04W 60/04 | 455/435.1 |
| 2014/0301371 A1* | 10/2014 | Maeda | H04W 36/0011 | 370/331 |
| 2014/0364079 A1* | 12/2014 | DiFazio | H04W 88/04 | 455/404.1 |
| 2015/0004930 A1* | 1/2015 | Kim | H04W 48/18 | 455/406 |

* cited by examiner

MANAGING ALLOCATION OF FREQUENCY BANDWIDTH BETWEEN DONOR ACCESS LINK AND RELAY BACKHAUL LINK

BACKGROUND

Unless otherwise indicated herein, the materials described in this section are not prior art to the claims and are not admitted to be prior art by inclusion in this section.

In a typical market area, wireless service providers may operate radio access networks (RANs) each arranged to provide user equipment devices (UEs) with wireless communication service. Each such a RAN may include a number of base stations that radiate to define wireless coverage areas in which to serve UEs according to a radio access technology such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1xRTT and 1xEV-DO), GSM, GPRS, UMTS, EDGE, iDEN, TDMA, AMPS, MMDS, WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station or by other base stations.

A wireless service provider may operate one or more such RANs as a public land mobile network (PLMN) for serving UEs. For example, a service provider may operate an LTE RAN as a PLMN for serving UEs with LTE service. In general, each such PLMN may have a respective PLMN identifier (PLMNid), and UEs that subscribe to service of the PLMN may be provisioned with data indicating that PLMNid. For instance, the UE may maintain in data storage a terminal identifier that uniquely identifies the UE and that includes an indication of the PLMNid to which the UE subscribes, such as an international mobile subscriber identity (IMSI) that includes as its first six digits the PLMNid. Further, the UE may be provisioned with program logic that causes the UE to provide an indication of its PLMNid to a base station when the UE seeks to be served by the base station, such as to provide the base station with the UE's IMSI including the UE's PLMNid.

(Note also that some radio access technologies may use other terms to characterize the service provider's network to which UEs may subscribe, and those other networks could be considered types of PLMNs for purposes of this disclosure even though they are characterized by other terms. For instance, CDMA identifies a service provider's network by a combination of system identifier and network identifier (SID/NID). Other examples are possible as well.)

In addition to operating a RAN as its own PLMN (home PLMN) for serving its own subscriber UEs, a wireless service provider may also operate a RAN on behalf of one or more other wireless service providers known as "mobile virtual network operators" (MVNOs), to allow the MVNOs to provide wireless communication service without the need to build out RANs of their own. (In practice, an MVNO may be a different company than the actual RAN operator or may be the same company as the actual RAN operator.) In this arrangement, the MVNO may be considered to provide an MVNO PLMN, which may have its own PLMNid. However, the wireless service provider would in fact be operating its RAN not only as its own PLMN but also as the MVNO's PLMN. In addition, a wireless service provider that functions as an MVNO using the RAN of another service provider may also operate its own RAN in certain locations, and may in fact host service for the other service provider in certain locations, such that the other service provider would then function as an MVNO in those locations.

Still further, a wireless service provider may have roaming agreements with other wireless service providers, to provide a wider range of coverage for UEs. In such arrangements, a UE that subscribes to service of a service provider's PLMN but is not within sufficient coverage of that service provider's RAN may instead be served by another service provider's RAN, and the service providers may work with each other to account for the costs of that roaming service. In that case, from the perspective of the serving RAN, the UE would be a subscriber of a roaming partner PLMN.

In practice, base stations of a given RAN may therefore provide service for possibly multiple PLMNs. For instance, a base station operated by a wireless service provider may provide service for a PLMN of that service provider and may also provide service for PLMNs of one or more MVNOs, as well as PLMNs of one or more roaming partners.

In an ideal arrangement, the base stations of a wireless service provider's RAN would provide seamless coverage throughout the market area, so that UEs being served by the system could move from coverage area to coverage area without losing connectivity. In practice, however, it may not be possible to operate a sufficient number of base stations or to position the base stations in locations necessary to provide seamless coverage. As a result, there may be holes in coverage.

One way to help to resolve this problem is to operate a relay node that extends the range of a base station's coverage area so as to partially or completely fill a coverage hole. Such a relay node may be configured with a wireless backhaul interface for communicating with and being served by the base station in much the same way that a UE does, and a wireless access interface for communicating with and serving one or more UEs in much the same way that a base station does. Further, the relay node may include control logic for actively bridging the backhaul communications with the access communications. The relay node may thus receive and recover downlink communications from the donor base station and transmit those communications to the UEs served by the relay node, and may likewise receive and recover uplink communications from UEs served by the relay node and transmit those communications to the base station.

In this arrangement, the base station is considered a to be "donor base station," in that the base station provides coverage to the relay node and the relay node then provides coverage to one or more UEs. In practice, the wireless communication link between the donor base station and the relay node is considered to be a "relay backhaul link," and the wireless communication link between the relay node and UEs served by the relay node is considered to be a "relay access link." Further, to the extent the base donor station itself also serves UEs, the wireless communication link between the donor base station and those UEs is considered to be a "donor access link."

Advantageously, a relay node like this might have a relatively small form factor, with antenna height lower than the base station and with reduced transmit power requirements and cost. Consequently, a wireless service provider may conveniently employ such relay nodes throughout a region to help efficiently fill coverage holes and improve service quality.

Overview

A base station may have a certain extent of frequency bandwidth, such as a particular set of frequency bands, that the base station is permitted to use for serving various entities. In a scenario where a donor base station serves a relay node over a relay backhaul link and also serves one or more UEs over a donor access link, it may be advantageous for the donor base station to allocate that frequency bandwidth between the relay backhaul link and the donor access link, namely, to use a portion of the frequency bandwidth for the relay backhaul link and a different portion of the frequency bandwidth for the donor access link. At issue is then how to so allocate the frequency bandwidth.

Disclosed herein is a method and system for allocating frequency bandwidth between a relay backhaul link and a donor access link, based at least in part on the PLMN(s) to which UE(s) served by the relay node subscribe. In particular, the donor base station or another controlling entity may determine the PLMN(s) to which one or more UEs currently served by the relay node subscribe and, based at least in part on the determined PLMN(s), may assign a PLMN-priority level to the relay. Based at least in part on the PLMN-priority level assigned to the relay, the controlling entity may then establish an allocation of the frequency bandwidth between the relay backhaul link and the donor access link, and the donor base station may apply that established allocation.

By way of example, the controlling entity may determine the PLMN to which each UE served over the relay access link by the relay node subscribes and, based on that determination for one or more UEs served by the relay node, may assign a first PLMN-priority level for the relay backhaul link. Further, the controlling entity may determine the PLMN to which each UE served over the donor access link by the donor base station subscribes and, based on that determination for one or more UEs served by the donor base station, may assign a second PLMN-priority level for the donor access link. Based at least in part on a comparison of the first PLMN-priority level with the second PLMN-priority level, the controlling entity may then establish an allocation of the frequency bandwidth between the relay backhaul link and the donor access link. And the donor base station may then apply that established allocation.

The allocation of frequency bandwidth may involve an allocation of a portion of the frequency bandwidth to the relay backhaul link and a different portion of the frequency bandwidth to the donor access link. For instance, if the donor base station has a number of bands on which it is licensed to operate or otherwise on which it can operate, the controlling entity may decide through this process to allocate a subset of those bands for use to define the relay backhaul link and a different, mutually exclusive subset of those bands for use to define the donor access link, and the donor base station may apply that allocation. Likewise, if the donor base station has a number of frequency channels on which it can operate, the controlling entity may decide through this process to allocate a subset of those frequency channels for use to define the relay backhaul link and a different, mutually exclusive subset of those channels for use to the define the donor access link. Further, there could in theory be a partial overlap, with one or more portions of frequency bandwidth being used on both the relay backhaul link and the donor access link.

Accordingly, in one respect, disclosed is a method operable in a wireless communication system in which a donor base station is configured to serve UEs over a donor access link and is configured to serve a relay node over a relay backhaul link, and in which the relay node is configured to serve UEs over a relay access link. The method provides for allocating frequency bandwidth between the relay backhaul link and the donor access link and involves (i) making a determination of one or more PLMNs to which one or more UEs currently served over the relay access link by the relay node subscribe, (ii) based at least in part on the determination, establishing an allocation of the frequency bandwidth between the relay backhaul link and the donor access link, and (iii) applying the established allocation.

In another respect, disclosed is a base station that is configured to wirelessly communicate over a donor access link with one or more UEs served by the base station and over a relay backhaul link with a relay node served by the base station, where the relay node is configured to communicate over a relay access link with one or more UEs served by the relay node. The base station includes a controller that is configured (i) to make a determination of one or more PLMNs to which the one or more UEs served by the relay node subscribe, and (ii) based at least in part on the determination, to allocate frequency bandwidth between the donor access link and the relay backhaul link.

Further, in still another respect, disclosed is a system that includes a donor base station and a relay node. The donor base station is configured to serve one or more UEs over a donor access link and to serve a relay node over a relay backhaul link, and the relay node is configured to serve one or more UEs over a relay access link. Further, the donor base station is configured (i) to make a determination of one or more PLMNs to which the one or more UEs served over the relay access link by the relay node subscribe, and (ii) based at least in part on the determination, to allocate frequency bandwidth between the donor access link and the relay backhaul link.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
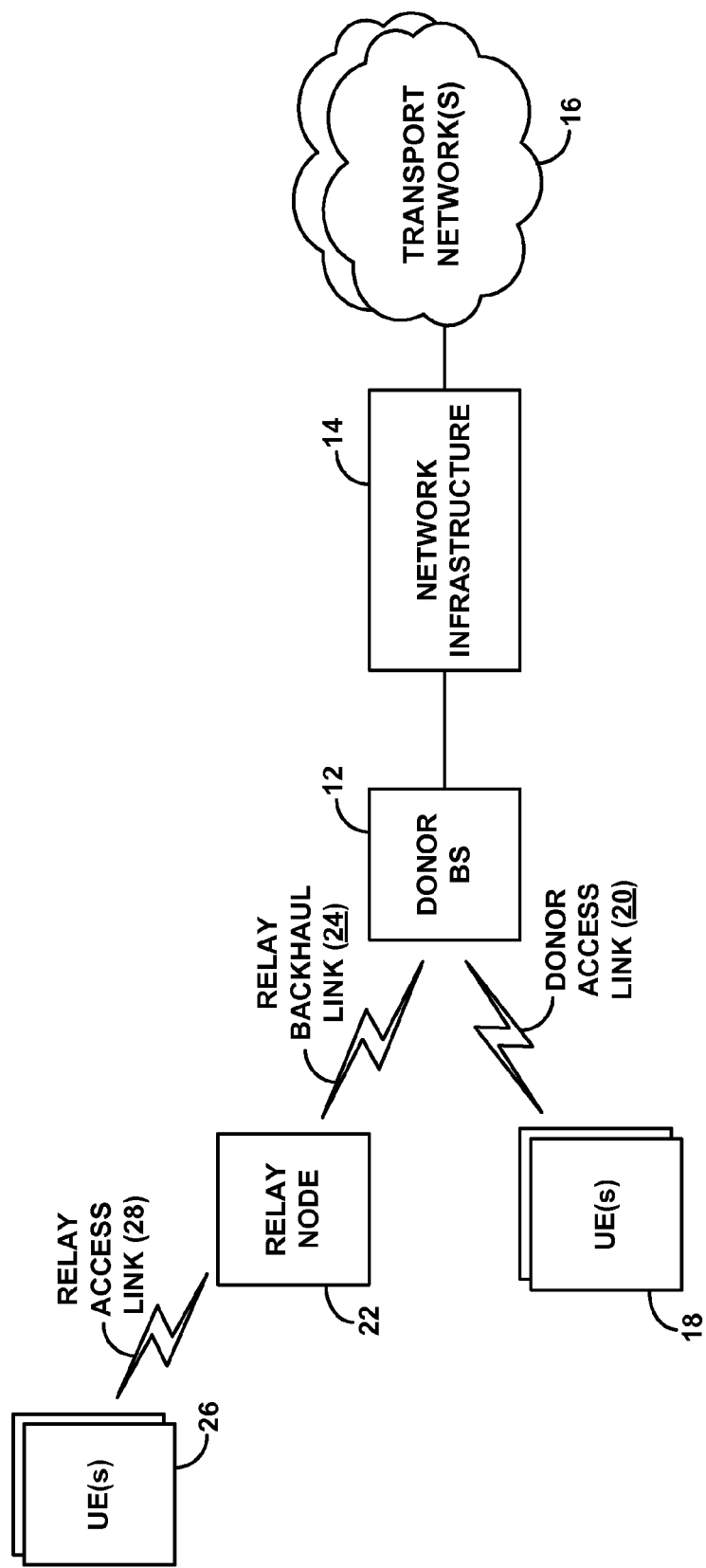
FIG. 1 is a simplified block diagram of an example communication system in which the present method can be implemented.

Referring to the drawings, as noted above, FIG. 1 is a simplified block diagram of an example communication system in which the present method can be implemented. The illustrated communication system includes a representative donor base station 12 that is interconnected with network infrastructure 14, such as a switch or gateway, providing connectivity with one or more transport networks 16 such as the PSTN and/or the Internet. The donor base station 12 is shown serving one or more UEs 18 over a donor access link 20 and serving a relay node 22 over a relay backhaul link 24.

Further, the relay node 22 is shown serving one or more UEs 26 over a relay access link 28.

Through this arrangement, the UEs 18 served over the donor access link 20 by the donor base station 12 may engage in communication on the transport network(s) 16 via the donor access link, the donor base station, and the network infrastructure. Further, the UEs 26 served over the relay access link 28 by the relay node 22 may engage in communication on the transport network(s) 16 via the relay access link, the relay node, the relay backhaul link, the donor base station, and the network infrastructure.

In practice, the donor base station may serve the relay node 22 and the UEs 18 in accordance with any of a variety of air interface protocols, including for instance any of those discussed above. For instance, the donor base station may serve the relay node 22 and the UEs 18 in accordance with LTE, or the donor base station may serve the relay node 22 and UEs 18 in accordance with CDMA. Further, there could be some difference between the air interface protocol that the donor base station uses for the relay backhaul link to serve the relay node 22 and the air interface protocol that the donor base station uses for the donor access link to serve the UEs 18.

In a representative implementation, the donor base station may be licensed to engage in wireless communication using particular frequency bandwidth or may otherwise be arranged to engage in wireless communication using particular frequency bandwidth. The frequency bandwidth at issue could be one or more ranges of frequency, such as one or more frequency bands, one or more frequency channels, or the like. As a specific example, the donor base station may be licensed to engage in wireless communication using the 700 MHz band (one or more frequency ranges around 700 MHz), the 800 MHz band (one or more frequency ranges around 800 MHz), the 1.9 GHz band (one or more frequency ranges around 1.9 GHz), and the 2.5 GHz band (one or more frequency ranges around 2.5 GHz). In practice, for instance, the donor base station may provide service on one or more carrier frequencies or ranges of carrier frequencies within each supported band. Further, the wireless communication between the donor base station and any entity served by the donor base station may be frequency division duplex, in which the uplink and downlink differ from each other in frequency, or time division duplex, in which the uplink and downlink use the same frequency but are multiplexed over time.

In accordance with this disclosure, at issue is then how the donor base station should allocate that frequency bandwidth between the relay backhaul link and the donor access link, i.e., what portion of that frequency bandwidth the donor base station should use for its wireless communication with the relay node 22 over the relay backhaul link 24 and what other portion of that frequency bandwidth the donor base station should use for its wireless communication with the one or more UEs 18 that the donor base station serves over the donor access link 20.

The present disclosure provides for establishing that allocation based at least in part on a consideration of the PLMNs to which UEs currently served by the relay node 22 over the relay access link 28 subscribe. In particular, a controlling entity such as the donor base station itself may determine which one or more UEs 26 are currently being served by relay node 22 and may determine the PLMN to which each such UE subscribes, and the controlling entity may then establish an allocation of the frequency bandwidth accordingly. As such, the controlling entity may be configured to allocated a greater or lesser portion of the frequency bandwidth to the relay backhaul link 24 than to the donor access link 20 depending on whether a greater or lesser number of UEs served by the relay node 22 subscribe to particular PLMNs deemed to have greater or lesser priority.

By way of example, the controlling entity may be configured to give higher priority to a PLMN provided by the operator of the donor base station than to an MVNO PLMN or roaming partner PLMN on behalf of which the donor base station provides service. Further, the controlling entity might be configured to give higher priority to an MVNO PLMN on behalf of which the donor base station provides service than to a roaming partner PLMN on behalf of which the donor base station provides service. Or the controlling entity may give other relative priority levels to these or other types of PLMNs.

In practice, the controlling entity may thus determine, for each UE currently served by the relay node 22, the PLMN to which that UE subscribes and may assign a respective PLMN-priority weight to that UE based on the priority level of that PLMN, with a higher PLMN-priority weight being assigned for a UE that subscribes to a higher priority PLMN. Further, the controlling entity may total those PLMN priority weights or otherwise use them cooperatively to determine a representative relay priority level for the relay backhaul link, and the controlling entity may then establish an allocation of the frequency bandwidth based on that determined relay priority level. If the controlling entity is not the donor base station, the controlling entity may then communicate the established allocation to the donor base station. And the donor base station may then apply the established allocation.

Establishing the allocation of the donor base station's frequency bandwidth may address the question of how much of the donor base station's frequency bandwidth the donor base station should use for its wireless communication with the relay node 22 on the relay backhaul link 24, leaving some remaining portion of the frequency bandwidth to use for its wireless communication with the UE(s) 18 on the donor access link 20. Alternatively, establishing the allocation may address the question of how to relatively divide the frequency bandwidth between relay backhaul link use and donor access link use.

To address the relative division of the frequency bandwidth, the controlling entity may consider not only the PLMN(s) to which the UE(s) currently served over the relay access link 28 by the relay node 22 subscribe, but also the PLMN(s) to which the UE(s) currently served over the donor access link 20 by the donor base station 12 subscribe. Applying an analysis such as that described above, for instance, the controlling entity may consider a PLMN-priority weight respectively of each of the one or more UEs 26 served over the relay access link 28 by the relay node 22 to determine a representative relay priority level, and the controlling entity may likewise consider a PLMN-priority weight respectively each of the one or more UEs 18 served over the donor access link 20 by the donor base station 12 to determine a representative donor priority level. The controlling entity may then compare the determined relay priority level with the determined donor priority level, such as by computing a ratio of the two, and apply that comparison to establish the allocation of frequency bandwidth, and the donor base station may then apply that established allocation.

As a simplified example of this, assuming that that the donor base station has three units of frequency bandwidth, such as three bands for instance, if the relay priority level determined through this process is twice as high as the donor priority level, then the controlling entity may determine that ⅔ of the frequency bandwidth should be used for the relay backhaul and ⅓ of the frequency bandwidth should be used for the donor access link. Thus, in the event the donor base station is not currently applying that particular allocation, the donor base station may take action to apply that allocation, such as by notifying the relay node of the change in frequency allocation and by beginning to serve the UE(s) 18 with a changed extent of donor access frequency.

Further, the controlling entity may repeat this process periodically and/or in response to various trigger events. Thus, with changes in which PLMNs' subscriber UEs are served by the relay node over the relay access link, perhaps by way of comparison with which PLMNs' subscriber UEs are served by the donor base station over the donor access link, this process may result in the donor base station dynamically changing how much of its frequency bandwidth it allocates to the relay backhaul link versus the donor access link.

Figure 2:
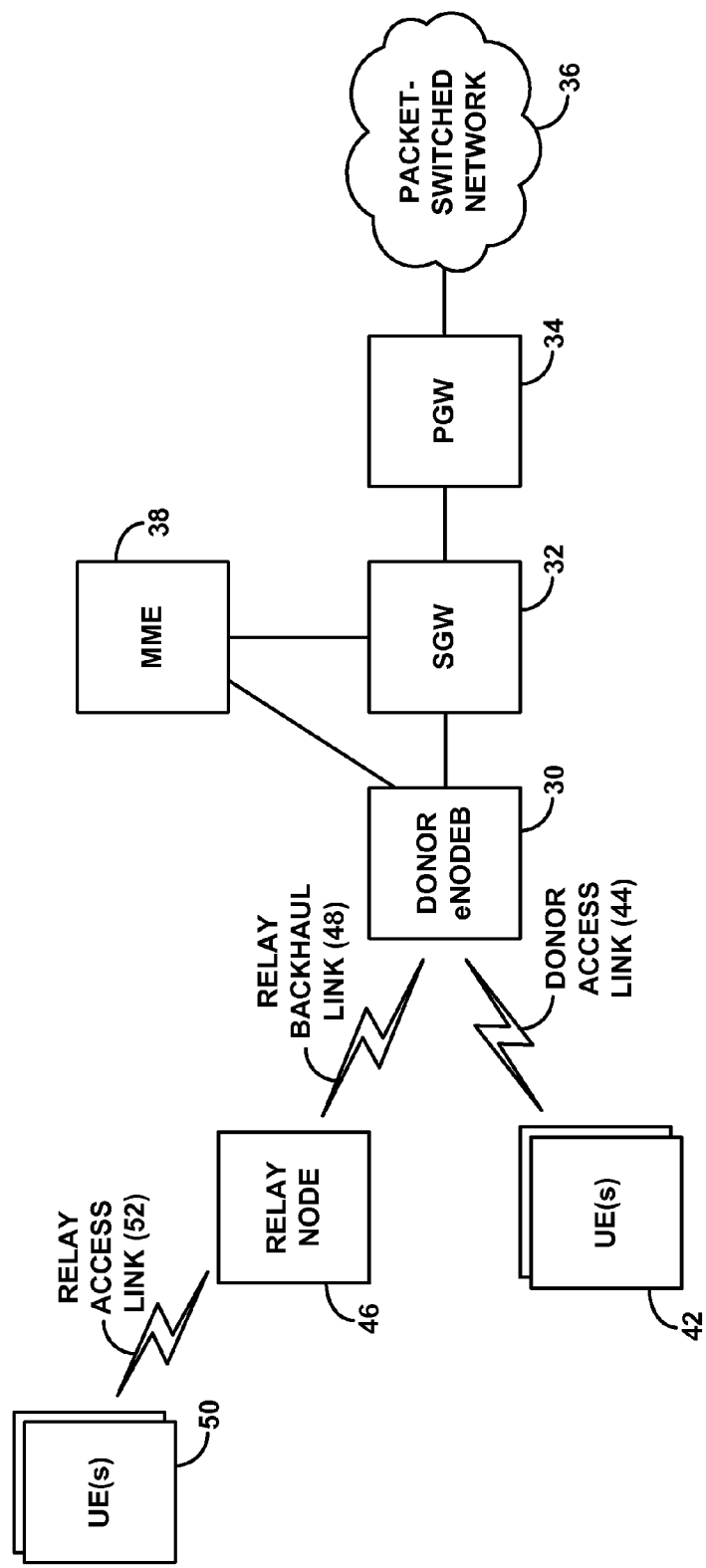
FIG. 2 is another simplified block diagram of an example communication system in which the present method can be implemented.

FIG. 2 is next another simplified block diagram of a communication system in which the present method can be implemented. In particular, FIG. 2 depicts an example LTE network in which the method can be implemented. As shown in this figure, the donor base station takes the form of a donor LTE eNodeB 30. The donor eNodeB has an interface with a serving gateway (SGW) 32, which in turn has an interface with a packet data network gateway (PGW) 34 that provides connectivity with a packet-switched network 36 such as the Internet. Further, the donor eNodeB has an interface with a mobility management entity (MME) 38, which functions to manage various connections in the LTE network, such as to manage registration of UEs with the network and to establish bearer connections for carrying UE data communications between the donor eNodeB and the PGW.

In this arrangement, analogous to that in FIG. 1, the donor eNodeB 30 serves one or more UEs 42 over a donor access link 44 and further serves a relay node 46 over a relay backhaul link 48, and the relay node 46 in turn serves one or more UEs 50 over a relay access link 52. Further, this arrangement assumes by way of example that the donor eNodeB 30 provides LTE service to the UE(s) 42 over the donor access link 44 and to the relay node 46 over the relay backhaul link 48, and that the relay node 46 in turn provides LTE service to the UE(s) 50 over the relay access link 52.

For simplicity, the discussion of this arrangement will focus on the downlink from the donor eNodeB 30 to the UEs 42 and the relay node 46. However, the same analysis may apply with respect to the uplink. Further, the principles of the present disclosure could apply both in an FDD arrangement and in a TDD arrangement. Still further, although the donor eNodeB may also serve additional relay nodes beyond the one depicted in the figure, this discussion will focus on the single relay implementation for simplicity.

In an example LTE implementation, the donor eNodeB may be licensed to operate on various frequency bands such as those noted above, with frequency channels ranging in width from 3 MHz to 20 MHz, and the donor eNodeB may be able to use any set of those bands and/or channels for the relay backhaul link 48 or for the donor access link 44. In the example implementation, the donor eNodeB may establish an allocation of that frequency bandwidth between the relay backhaul link and the donor access link based on a consideration of the PLMN(s) to which the UE(s) 50 served by the relay node 46 subscribe and perhaps further based on a consideration of the PLMN(s) (or, more generally, the types of PLMN(s)) to which the UE(s) served over the donor access link 44 by the donor eNodeB 30 subscribe.

The donor eNodeB 30 may determine the PLMN (or type of PLMN) to which each UE served by the relay node subscribes in various ways. By way of example, when each such a UE initially attaches to (registers with) the relay node, the UE may include in its attach request its IMSI, which as noted above my specify the PLMNid of the PLMN to which the UE subscribes. When the relay node receives that attach request, the relay node may forward the request over a control channel on the relay backhaul link 48 to the donor eNodeB. The donor eNodeB may then read the PLMNid from that attach request and record the fact that the UE being served by the relay node subscribes to that PLMN. Alternatively, the donor eNodeB may forward that attach request along to the MME 38, and the MME may extract the PLMNid and send it to the donor eNodeB so that the eNodeB can similarly record that the UE being served by the relay node subscribes to that PLMN. In turn, when such a UE detaches from the relay node, similar messaging may cause the donor eNodeB to update its record accordingly.

Likewise, the donor eNodeB may determine the PLMN to which each the UE served by the donor eNodeB subscribes in various ways. For instance, when such a UE initially attaches to the donor eNodeB, the donor eNodeB may read the UE's PLMNid from that attach request and record the fact that the UE served by the donor eNodeB subscribes to that PLMN. Alternatively, the donor eNodeB may forward that attach request along to the MME, and the MME may extract the PLMNid and send it to the donor eNodeB so that the eNodeB can similarly record that the UE being served by the donor eNodeB subscribes to that PLMN. And likewise, when such a UE detaches from the donor eNodeB, similar messaging may cause the donor eNodeB to update its record accordingly.

Further, the donor eNodeB may be programmed with data or logic that predefines PLMN-priority weights per PLMN or type of PLMN, keyed to PLMNid for instance, such as a highest priority level for a home PLMN, a next priority level for an MVNO PLMN, and a next priority level for a roaming partner PLMN. And the donor eNodeB may assign those PLMN-priority weights to the UE(s) based on the PLMNs to which they subscribe, so as to determine a representative relay priority level and a representative donor priority level.

For instance, the donor eNodeB may keep a running total of PLMN-priority weights for UE(s) attached to the relay node and separately for the UE(s) attached to the donor eNodeB. As each UE attaches to the relay node, the donor eNodeB may determine the PLMN-priority weight based on the priority level of the PLMN to which that UE subscribes and may add that PLMN-priority weight to a relay priority level. And as each UE detaches from the relay node, the donor eNodeB may similarly determine the associated PLMN-priority weight and may subtract that weight from the relay priority level. Likewise, as each UE attaches to the donor eNodeB, the donor eNodeB may determine the PLMN-priority weight based on the priority level of the PLMN to which that UE subscribes and may add that PLMN-priority weight to a donor priority level. And as each UE detaches from the donor eNodeB, the donor eNodeB may similarly determine the associated PLMN-priority weight and subtract that weight from the donor priority level.

Based on the determined relay priority level and the determined donor priority level, the donor eNodeB may then establish an allocation of its frequency bandwidth between the relay backhaul link and the donor access link. As discussed above, for instance, the donor eNodeB may compute a ratio of the priority levels and apply that ratio to establish the allocation. For example, the relay priority level determined through this process is twice as high as the donor priority level determined through this process, the donor eNodeB may responsively allocate twice as much of its frequency bandwidth to the relay backhaul link as to the donor access link.

As one example of this frequency allocation, consider a scenario where the donor eNodeB has three 10 MHz channels. In response to determining that the relay priority level is twice as high as the donor priority level, the donor eNodeB may allocate two of those channels to the relay backhaul link and the remaining channel to the donor access link. Whereas, if the donor eNodeB determines that the relay priority level is half of the donor priority level, then the donor eNodeB may allocate one of those channels to the relay backhaul link and two of the channels to the donor access link.

As another example, consider a scenario where the donor eNodeB has a 5 MHz channel and a 10 MHz channel. In response to determining that the relay priority level is twice as high as the donor priority level, the donor eNodeB may allocate the 10 MHz channel to the relay backhaul link and the 5 MHz channel to the donor backhaul link. Whereas, if the donor eNodeB determines that the relay priority level is half of the donor priority level, then the donor eNodeB may allocate the 5 MHz channel to the relay backhaul link and the 10 MHz channel to the donor access link.

Other example allocations are possible as well. Further, it should be understood that these determinations and allocations need not be exact. For instance, the donor eNodeB could round the priority levels or a ratio of the priority levels to a point that allows for allocation of appropriate portions of the frequency spectrum, such as based on the size of available channels or bands for example.

Once the donor eNodeB establishes the allocation of frequency bandwidth between the relay backhaul link and the donor access link, the donor eNodeB may then apply that allocation, unless the allocation is already in place. Thus, the donor eNodeB may transition from use of at least a particular part of the frequency bandwidth on one of the donor access link or the relay backhaul link to use of that particular part of the frequency bandwidth on the other of the donor access link or the relay backhaul link.

To do so, for instance, the donor eNodeB may signal to the relay node over a control channel on the relay backhaul link, to inform the relay node what frequency will be used for the relay backhaul link. In practice, this signaling may inform the relay node to use a different frequency and/or one or more different ranges of frequency than it is currently using for the relay backhaul communication with the donor eNodeB. The relay node and the donor eNodeB may then proceed to communicate on the relay backhaul link in accordance with the allocation.

Further, the donor eNodeB may signal to one or more UEs served on the donor access link to establish the frequency that will be used for communication on the donor access link. For instance, the donor eNodeB may change an overhead signaling message such as an LTE master information block (MIB) to indicate the new frequency and/or new frequency range(s). In addition, to the extent this change in frequency allocation will mean that a UE served by the donor eNodeB over the donor access link needs to change the frequency on which it communicates with the donor eNodeB, the donor eNodeB may transmit an inter-frequency handover directive to the UE to cause the UE to engage in an inter-frequency handover process so as to make that change.

Figure 3:
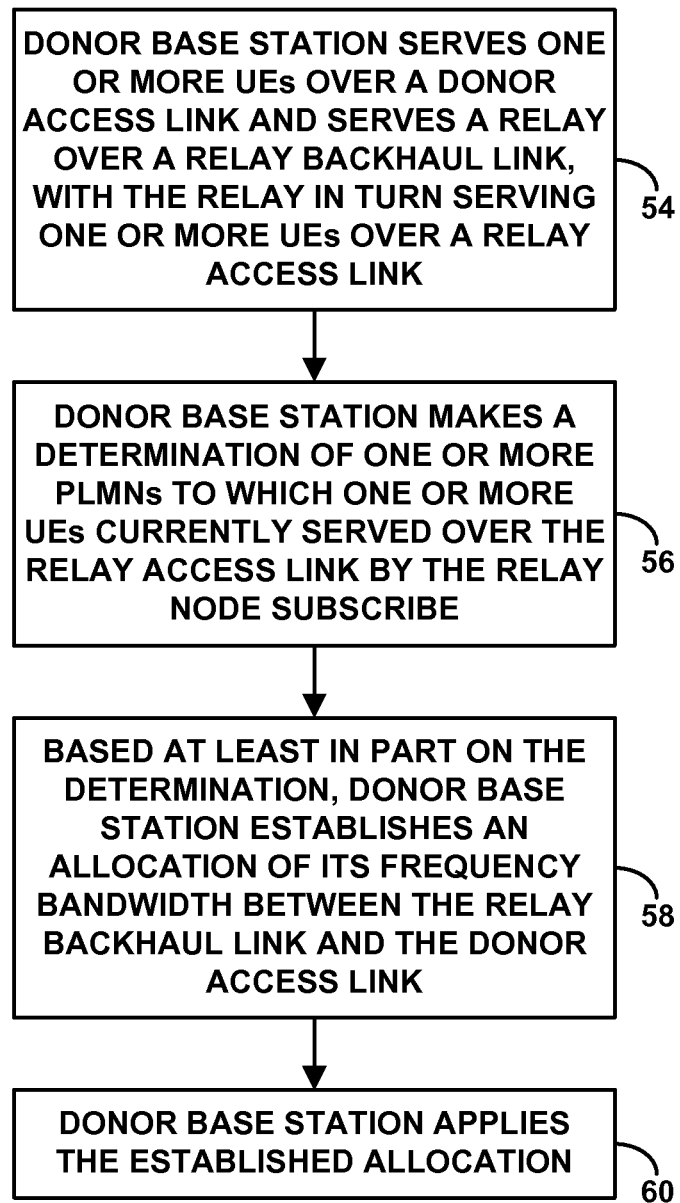
FIG. 3 is a flow chart depicting example functions that can be carried out in accordance with the method.

FIG. 3 is next a flow chart depicting functions that can be carried out in accordance with an example implementation of the present method, by a donor base station (or just as well by another controlling entity such as an MME for instance). As shown in FIG. 3, at block 54, a donor base station serves one or more UEs over a donor access link and serves a relay over a relay backhaul link, with the relay in turn serving one or more UEs over a relay access link. At block 56, the donor base station makes a determination of one or more PLMNs to which one or more UEs currently served over the relay access link by the relay node subscribe. At block 58, based at least in part on the determination, the donor base station establishes an allocation of its frequency bandwidth between the relay backhaul link and the donor access link. And at block 60, the donor base station applies the established allocation.

In line with the discussion above, each PLMN of the one or more PLMNs may have a respective priority level, each of the one or more UEs currently served over the relay access link by the relay node may subscribe to one of the PLMNs, and the act of establishing the allocation based at least in part on the determination may involve (i) assigning one or more PLMN-priority weights to the one or more UEs served over the relay access link by the relay node, including for each of the one or more UEs served over the relay access link by the relay node a respective PLMN-priority weight based on the priority level of the PLMN to which the UE subscribes, (ii) determining a representative relay priority level based on the assigned one or more PLMN-priority weights, such as by computing a total of the one or more assigned PLMN-priority weights, and (iii) establishing the allocation based on the determined representative relay priority level.

Further as discussed above, the donor base station may also determine one or more PLMNs to which one or more UEs currently served over the donor access link by the donor base station subscribe, and the act of establishing the allocation may be further based at least in part on this determination as well. For instance, in a process analogous to that described above, the donor base station may assign PLMN-priority weights for the UE(s) served over the donor access link by the donor base station and may assign a donor priority level. And the donor base station may then compare the determination of PLMNs of UEs served by the relay node (e.g., the relay priority level) with the determination of PLMNs of UEs served by the donor base station (e.g., the donor priority level) to establish the allocation of frequency bandwidth.

Figure 4:
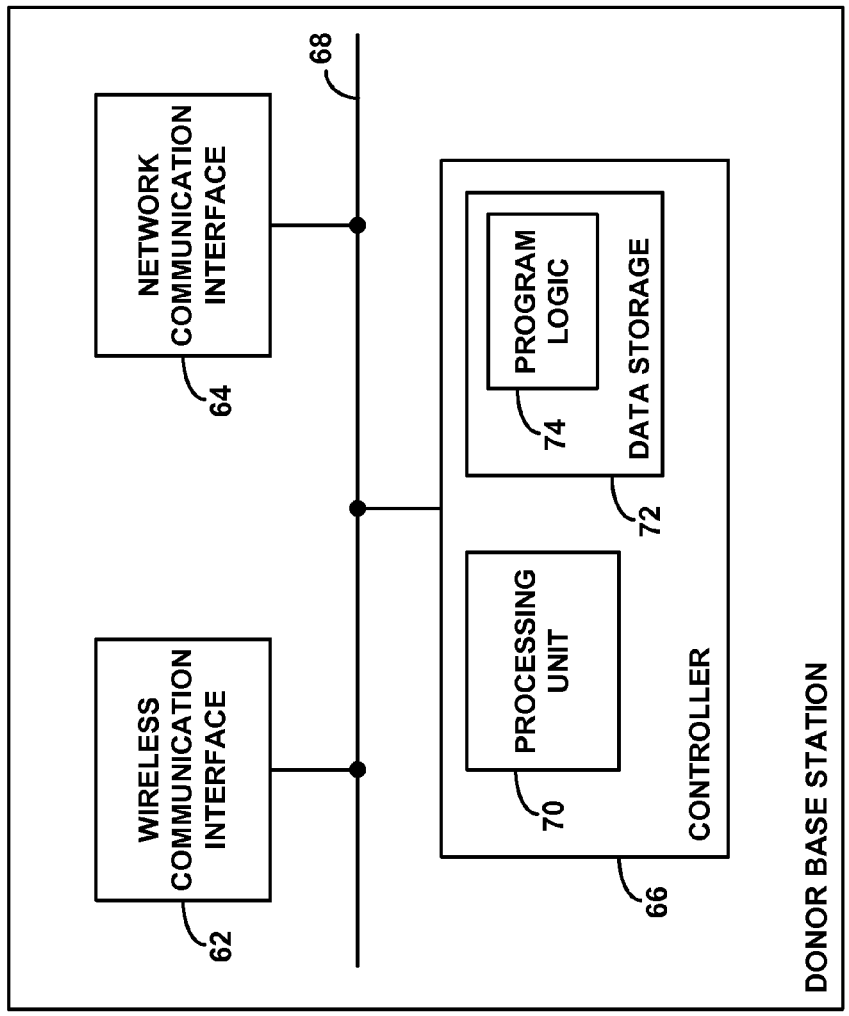
FIG. 4 is a simplified block diagram of a donor base station operable in the present method.

FIG. 4 is next a simplified block diagram of a representative donor base station, such as a base transceiver station, access node, access point, Node-B, or eNodeB, for instance (whether macro, femto or the like), illustrating some of the components that can be included in such an entity configured to operate in accordance with the present disclosure. As shown in FIG. 4, the representative donor base station includes a wireless communication interface 62, a network interface 64, and a controller 66, all of which may be integrated together in various ways and/or coupled together by a system bus, network, or other connection mechanism 68.

Wireless communication interface 62 may function to wirelessly serve various entities, such as UEs and a relay node as discussed above, communicating over a donor access link with one or more UEs and over a relay backhaul link with a relay node. As such, the wireless communication interface 62 may comprise an antenna arrangement (not shown), which may be tower mounted, and associated components such as a power amplifier and a cell site modem (not shown), so as to transmit and receive bearer and control data. Network interface 64 may then comprise a wired or wireless interface for communicating with various network infrastructure.

Controller 66 may then function to cause the donor base station to carry out various functions described herein, such as (i) to make a determination of one or more PLMNs to which the one or more UEs served by the relay node subscribe, and (ii) based at least in part on the determination, to allocate frequency bandwidth between the donor access link and the relay backhaul link. As such, controller 66 could take various forms. For instance, as shown, the controller may include a processing unit 70 (e.g., one or more general purpose or special purpose processors) and data storage 72 (e.g., volatile and/or non-volatile storage such as magnetic, optical, flash or other storage) holding program logic 74 (e.g., machine language instructions) executable by the processing unit to carry out the various donor base station functions.

Figure 5:
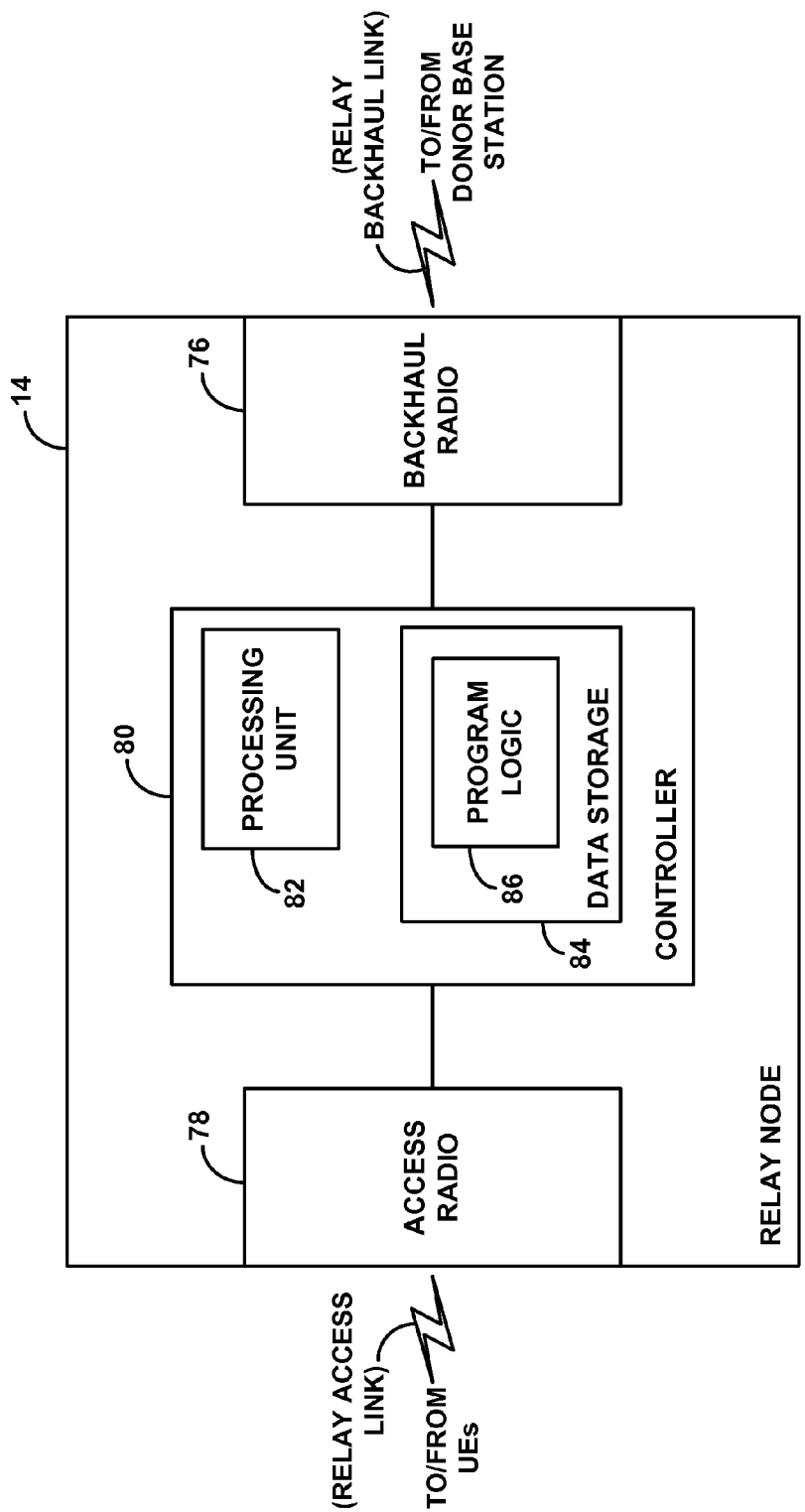
FIG. 5 is a simplified block diagram of a relay node operable in the present method.

Finally, FIG. 5 is a simplified block diagram of a representative relay node, illustrating some of the components that can be included in such an entity. As shown, the representative relay base station includes a wireless communication module comprising a backhaul radio 76 and an access radio 78, and a controller 80 for bridging communications between the backhaul radio and access radio.

Although the figure depicts these components as discrete blocks, the components may be integrated together in various ways or provided in other forms. For instance, the backhaul radio 76 and access radio 78 may be integrated together, perhaps on a single chipset. Further, the controller 80 may be integrated with either or both of the radios. Still further, although the figure depicts the controller with direct links to each of the radios, in an alternative arrangement the relay base station may include a system bus, network, or other connection mechanism to which the radios and controller may be communicatively linked. Other arrangements are possible as well.

In the illustrated relay base station, the backhaul radio 76 may function to engage in backhaul wireless communication with a donor base station via a relay backhaul link. To facilitate this, backhaul radio 76 may be largely the same type of radio that would be included in a UE designed to be served by a base station. The backhaul radio 76 may thus include an antenna arrangement (not shown) and associated components to facilitate transmitting and receiving bearer and control data in communication with the donor base station.

The access radio 78, on the other hand, may function to engage in access wireless communication with the one or more UEs via a relay access link. To facilitate this, the access radio 78 may be largely the same type of radio that would be included in a donor base station designed to serve such UEs. The access radio 78 may thus include an antenna arrangement (not shown) and associated components to facilitate transmitting and receiving bearer and control data in communication with the one or more UEs.

Controller 80, in turn, may function to actively bridge communications of the backhaul radio 76 with communications of the access radio 78, and thus to bridge certain relay backhaul link communications with certain relay access communications. In the example arrangement shown, controller 80 includes a processing unit 82 (e.g., one or more general purpose or special purpose processors) and data storage 84 (e.g., volatile and/or non-volatile storage such as magnetic, optical, flash or other storage) holding program logic 86 (e.g., machine language instructions) executable by the processing unit to carry out various relay node functions.

Exemplary embodiments have been described above. It should be understood, however, that variations from these embodiments are possible, while remaining within the true spirit and scope of the invention.

We claim:

1. In a wireless communication system in which a donor base station is configured to serve user equipment devices (UEs) over a donor access link and is configured to serve a relay node over a relay backhaul link, and in which the relay node is configured to serve UEs over a relay access link, a method of allocating frequency bandwidth between the relay backhaul link and the donor access link, the method comprising:

assigning one or more first public land mobile network (PLMN)-priority weights to one or more UEs served over the relay access link by the relay node, wherein the one or more first PLMN-priority weights includes, for each of the one or more UEs served over the relay access link by the relay node, a respective first PLMN-priority weight based on a priority level of a PLMN to which the UE subscribes;

assigning one or more second PLMN-priority weights to one or more UEs served over the donor access link by the donor base station, wherein the one or more second PLMN-priority weights includes, for each of the one or more UEs served over the donor access link by the donor base station, a respective second PLMN-priority weight based on a priority level of a PLMN to which the UE subscribes;

comparing (i) a representative relay priority level based on the assigned one or more first PLMN-priority weights with (ii) a representative donor access priority level based on the assigned one or more second PLMN-priority weights;

establishing an allocation of the frequency bandwidth between the relay backhaul link and the donor access link based on the comparing of the representative relay priority level with the representative donor access priority level; and applying the established allocation.

2. The method of claim 1, wherein the representative relay priority level based on the assigned one or more first PLMN-priority weights is a total of the one or more first PLMN-priority weights, and wherein the representative donor access priority level based on the assigned one or more second PLMN-priority weights is a total of the one or more second PLMN-priority weights.

3. The method of claim 1, wherein the allocation comprises an allocation to the relay backhaul link of a first portion of the frequency bandwidth and an allocation to the donor access link of a second portion of the frequency bandwidth, wherein the first portion and the second portion are mutually exclusive.

4. The method of claim 3, wherein the frequency bandwidth defines a plurality of frequency bands, wherein the first portion is a first proper subset of the plurality of bands, and the second portion is a second proper subset of the plurality of bands.

5. The method of claim 1, carried out by the donor base station.

6. The method of claim 5, wherein applying the allocation comprises transitioning from use of at least a particular part of the frequency bandwidth on one of the donor access link or the relay backhaul link to use of the particular part of the frequency bandwidth on the other of the donor access link or the relay backhaul link.

7. The method of claim 6, wherein the transitioning comprises directing at least one UE to engage in an inter-frequency handover process.

8. The method of claim 1, wherein each PLMN is of a type selected from the group consisting of a home PLMN, a mobile virtual network operator (MVNO) PLMN, and a roaming partner PLMN.

9. The method of claim 1, wherein the donor access link, the relay backhaul link, and the relay access link each operate according to an Orthogonal Frequency Division Multiple Access (OFDMA) air interface protocol.

10. A base station configured to wirelessly communicate over a donor access link with one or more user equipment devices (UEs) served by the base station and over a relay backhaul link with a relay node served by the base station, wherein the relay node is configured to communicate over a relay access link with one or more UEs served by the relay node, wherein the base station includes a controller configured to cause the base station to carry out operations comprising:

assigning one or more first public land mobile network (PLMN)-priority weights to the one or more UEs served by the relay node, wherein the one or more first PLMN-priority weights includes, for each of the one or more UEs served by the relay node, a respective first PLMN-priority weight based on a priority level of a PLMN to which the UE subscribes, assigning one or more second PLMN-priority weights to the one or more UEs served by the donor base station, wherein the one or more second PLMN-priority weights includes, for each of the one or more UEs served by the donor base station, a respective second PLMN-priority weight based on a priority level of a PLMN to which the UE subscribes, comparing (i) a representative relay priority level based on the assigned one or more first PLMN-priority weights with (ii) a representative donor access priority level based on the assigned one or more second PLMN-priority weights, establishing an allocation of frequency bandwidth between the relay backhaul link and the donor access link based on the comparing of the representative relay priority level with the representative donor access priority level, and applying the established allocation.

11. The base station of claim 10, wherein the representative relay priority level based on the assigned one or more first PLMN-priority weights is a total of the one or more first PLMN-priority weights, and wherein the representative donor access priority level based on the assigned one or more second PLMN-priority weights is a total of the one or more second PLMN-priority weights.

12. The base station of claim 10, wherein the allocation comprises an allocation to the relay backhaul link of a first portion of the frequency bandwidth and an allocation to the donor access link of a second portion of the frequency bandwidth, wherein the first portion and the second portion are mutually exclusive.

13. The base station of claim 12, wherein the frequency bandwidth defines a plurality of frequency bands, wherein the first portion is a first proper subset of the plurality of bands, and the second portion is a second proper subset of the plurality of bands.

14. The base station of claim 10, wherein applying the allocation comprises transitioning from use of at least a particular part of the frequency bandwidth on one of the donor access link or the relay backhaul link to use of the particular part of the frequency bandwidth on the other of the donor access link or the relay backhaul link.

15. The base station of claim 14, wherein the transitioning comprises directing at least one UE to engage in an inter-frequency handover process.

16. The base station of claim 10, wherein each PLMN is of a type selected from the group consisting of a home PLMN, a mobile virtual network operator (MVNO) PLMN, and a roaming partner PLMN.

17. The base station of claim 1, wherein the donor access link, the relay backhaul link, and the relay access link each operate according to an Orthogonal Frequency Division Multiple Access (OFDMA) air interface protocol.

18. A system comprising:

a donor base station; and a relay node, wherein the donor base station is configured to serve one or more user equipment devices (UEs) over a donor access link and to serve a relay node over a relay backhaul link, wherein the relay node is configured to serve one or more UEs over a relay access link, and wherein the donor base station is further configured to carry out operations comprising:

assigning one or more first public land mobile network (PLMN)-priority weights to the one or more UEs served by the relay node, wherein the one or more first PLMN-priority weights includes, for each of the one or more UEs served by the relay node, a respective first PLMN-priority weight based on a priority level of a PLMN to which the UE subscribes, assigning one or more second PLMN-priority weights to the one or more UEs served by the donor base station, wherein the one or more second PLMN-priority weights includes, for each of the one or more UEs served by the donor base station a respective second PLMN-priority weight based on a priority level of the PLMN to which the UE subscribes, comparing (i) a representative relay priority level based on the assigned one or more first PLMN-priority weights with (ii) a representative donor access priority level based on the assigned one or more second PLMN-priority weights, establishing an allocation of frequency bandwidth between the relay backhaul link and the donor access link based on the comparing of the representative relay priority level with the representative donor access priority level, and applying the established allocation.

19. The system of 18, wherein the representative relay priority level based on the assigned one or more first PLMN-priority weights is a total of the one or more first PLMN-priority weights, and wherein the representative donor access priority level based on the assigned one or more second PLMN-priority weights is a total of the one or more second PLMN-priority weights.

20. The system of claim 18, wherein the allocation comprises an allocation to the relay backhaul link of a first portion of the frequency bandwidth and an allocation to the donor access link of a second portion of the frequency bandwidth, wherein the first portion and the second portion are mutually exclusive.

\* \* \* \* \*